Patented July 4, 1944

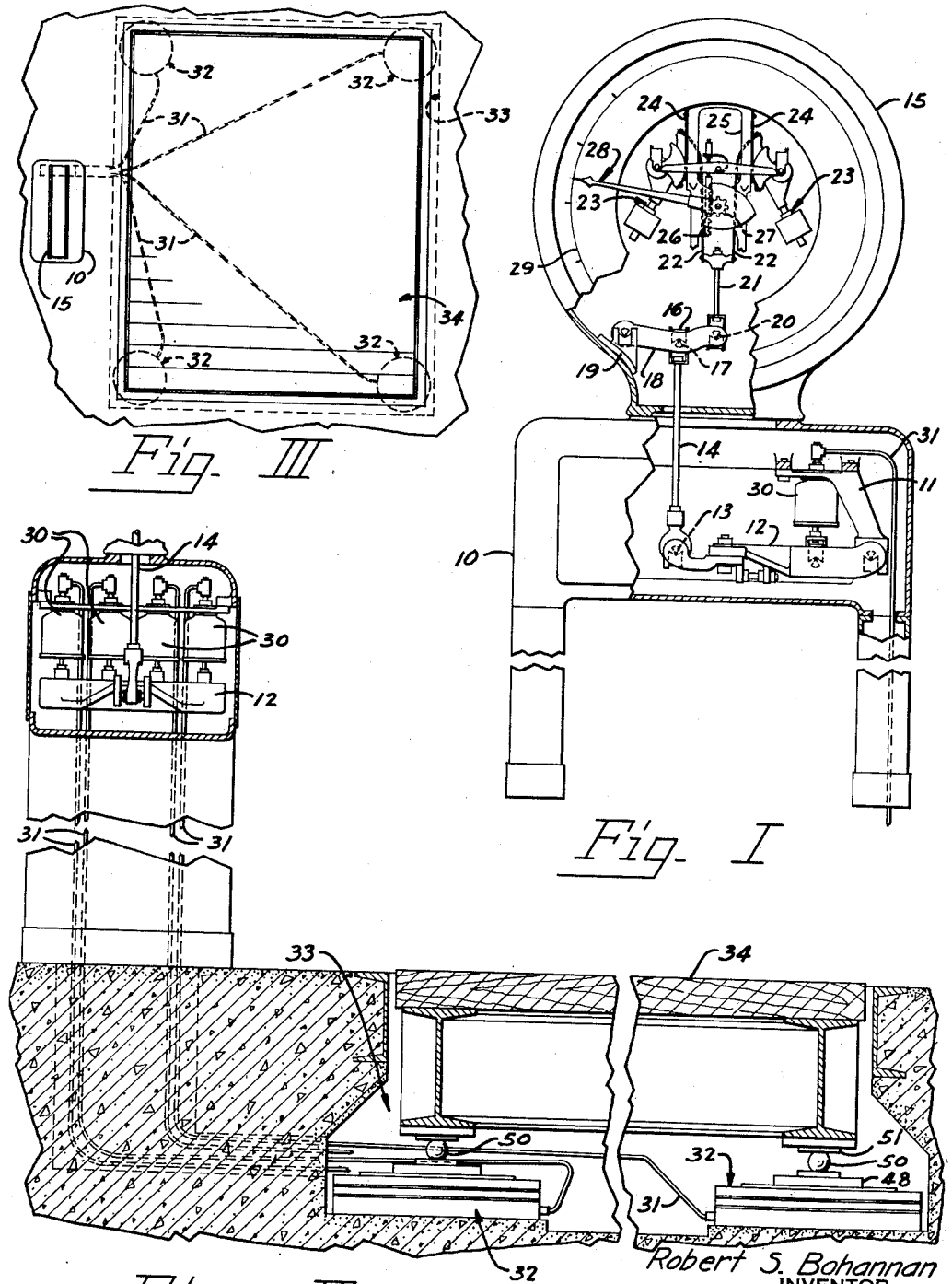

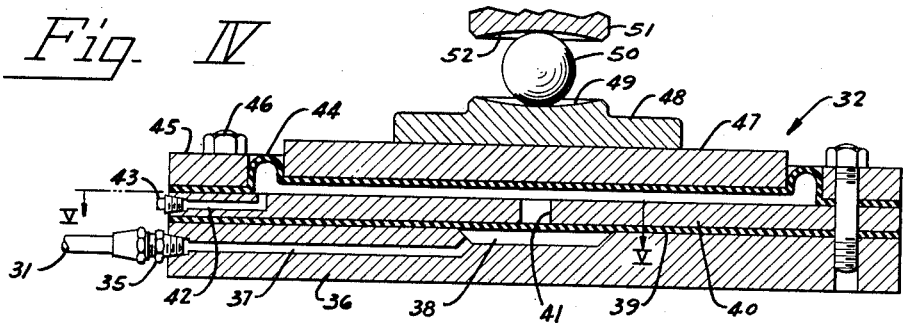
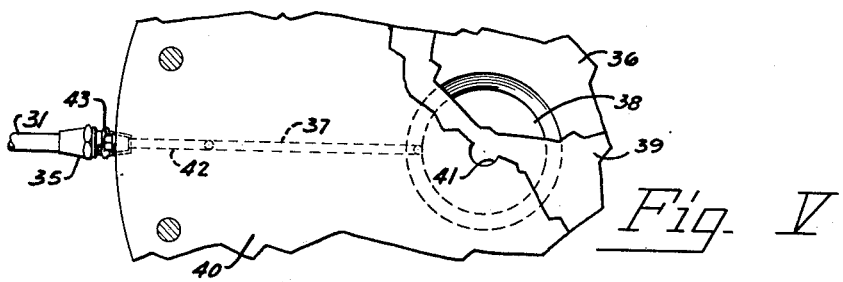
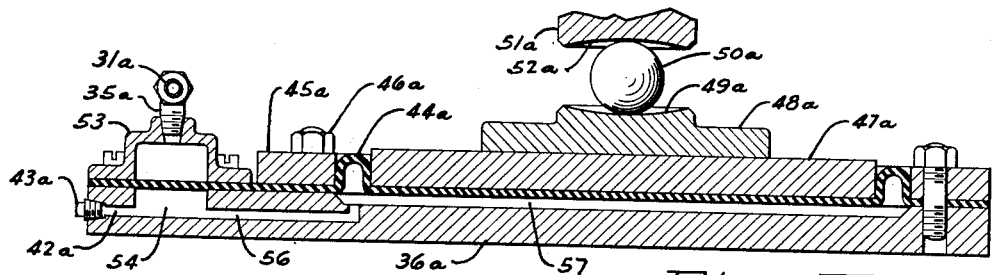
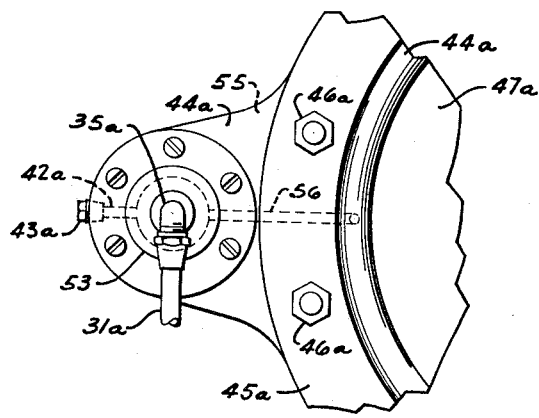

2,352,934

UNITED STATES PATENT OFFICE 2,352,934

HYDRAULIC FORCE TRANSMISSION

Robert S. Bohannan, Toledo, Ohio, assignor to Toledo Scale Company, Toledo, Ohio, a corporation of New Jersey Application June 4, 1941, Serial No. 396,601

6 Claims. (Cl. 265—47)

This invention relates to weighing scales of the type wherein transmission of force from the weight receiving mechanism to the weight counterbalancing and indicating mechanism is accomplished by means of a hydraulic system, and more particularly to a portion of the hydraulic system itself.

In a hydraulic type scale it is most essential that all air be removed from the hydraulic system. If any air exists in the hydraulic system, the pressure created by a load placed upon the scale will compress this air, thereby dissipating the pressure so that it will not be fully applied to the load counterbalancing and weight indicating mechanism. Elimination of air from some portions of the hydraulic system is more difficult than from others due to their location or their construction. This is particularly true of the diaphragm capsules themselves (the capsules being those members of the hydraulic system on which the load receiving mechanism is supported).

It is also essential that the capsules be filled with the correct amount of liquid so that the capsule diaphragms, when the scale is at rest under no load, will be properly positioned in relation to the capsule base plates and not under great torsion or strain.

It is an object of this invention to provide a means whereby such a diaphragm capsule can be filled with air free liquid in the factory where it is made, since the removal of air from the liquid is an operation which can only be successfully carried out under carefully controlled conditions.

It is a further object of this invention to provide a capsule, the liquid content of which can be carefully determined under the ideal conditions existing at one place, such as at the factory constructing the capsule, and maintained during the shipment of the capsule to the place of installation of the scale and during the subsequent installation thereof.

More specific objects and advantages are apparent from the description, in which reference is had to the accompanying drawings illustrating a preferred form of scale embodying the invention.

In the drawings:

Fig. I is a view in front elevation of the load counterbalancing and weight indicating mechanism of a scale embodying the invention.

Fig. II is a view in vertical section of the scale, showing the weight receiving mechanism, the hydraulic system and parts associated therewith.

Fig. III is a plan view of the scale, the positions of the capsules being indicated in dotted lines.

Fig. IV is a view in vertical section of a capsule incorporating one form of the invention.

Fig. V is a fragmentary horizontal sectional view taken on the line V—V of Fig. IV.

Fig. VI is a view in vertical section of a capsule embodying a modification of the invention.

Fig. VII is a fragmentary plan view of the capsule illustrated in Fig. VI.

These specific drawings and the specific description that follows merely disclose and illustrate the invention and are not intended to impose limitations upon the claims.

Mechanism illustrated generally in the accompanying drawings, but which does not constitute part of the instant invention, is fully described in my copending applications Ser. Nos. 222,831, 299,832 and 299,834 and such mechanism therefore is described herein only in such detail as will suffice to enable the connection of the instant invention therewith to be clearly understood.

Mounted within the main housing 10 is a bracket 11 in which is fulcrumed an adjustable shelf lever 12. A nose pivot 13 is mounted in the end of the lever 12 and rests upon a bearing carried in the yoke on the end of a vertical pull rod 14. The pull rod 14 extends upwardly into a dial housing 15 and has mounted on its upper end a clevis-held bearing 16. The bearing 16 engages a pivot 17, carried in a multiplication lever 18 which is fulcrumed in a bracket 19 mounted within the housing 15. The mutliplication lever 18 has a nose pivot 20 which is connected, by means of a link 21 and flexible metallic ribbons 22, to a pair of load counterbalancing pendulums 23 which are supported by metallic ribbons 24 upon a frame 25 mounted within the dial housing 15. Connected, by means of a rack 26 and a pinion 27, to the pendulums 23 is an indicating pointer 28 which swings over the chart 29 to indicate the weights of loads placed upon the scale.

Mounted in the bracket 11 are chambers 30, and within the chambers are located metallic bellows (not shown) which are acted upon by the pressures in the hydraulic systems of the scale. Connected to the chambers 30 are corresponding pipes 31, each leading to a corresponding capsule 32 located in a scale pit 33. Supported upon the upper plates of the capsules 32 is a scale platform 34.

The pipe 31 (Fig. IV) is connected to a fitting 35 which is attached to a capsule base plate 36. The fitting 35 is fitted into a port at the end of a passage 37 connected with a dish-shaped depression 38 in the upper surface of the base plate 36. A secondary diaphragm 39 extends across the depression 38 lying on the upper surface of the base plate 36. A subplate 40, having a centrally bored hole 41, extends over the upper surface of the secondary diaphragm 39. The subplate 40 has a tapped hole 42, which is adapted to be stopped up by a plug 43 leading from the outside of the capsule to the space immediately above the subplate 40 over which is placed a beaded diaphragm 44 held in place by a clamping ring 45 and nuts 46. Supported on the beaded diaphragm 44 is a disk-shaped upper capsule plate 47 on which is centrally located a pedestal 48 having a concave depression 49 in its upper surface. A ball 50 rests in the depression 49 and carries a platform leg 51 which also has a concave depression 52 in contact with the ball 50.

When a load is placed upon the platform 34, pressure applied to the beaded diaphragm 44 is transmitted through the centrally located hole 41 in the subplate 40 to the secondary diaphragm 39. Since the diaphragm 39 is very flexible, this pressure is transmitted to the liquid below the diaphragm 39, in the depression 38, through the passage 37 and the pipe 31 to the chamber 30, compressing the bellows contained therein. By means of the shelf lever 12, and the multiplication lever 18, and their connected parts, force is applied to the load counterbalancing pendulums 23, the indication of the amount of weight being shown by the indicator 28.

In the factory, or other location having ideal filling conditions, liquid in the correct amount and containing no air is piped through the hole 42 into the opening between the diaphragm 44 and the secondary diaphragm 39. When the proper amount of liquid has been placed in the capsule, and the air completely exhausted therefrom, the plug 43 is screwed into the tapped hole 42, thus assuring the proper amount of air free liquid in the chamber.

Figures VI and VII illustrate a capsule embodying a modification of the invention. The pipe 31a is connected to a fitting 35a which is attached to a cup-like member 53 fastened to the capsule base plate 36a. Coextensive with, and located immediately below, the hollow interior of the cup-like member 53 is a cylindrical opening 54 in an ear 55 of the capsule base plate 36a. The cylindrical opening 54 is connected, by means of a passageway 56, to a dish-shaped depression 57 in the upper surface of the base plate 36a. A tapped hole 42a leads into the cylindrical opening 54 and can be stopped up by a plug 43a. Held in place by a clamping ring 45a and nuts 46a is a beaded diaphragm 44a which extends over the cylindrical opening 54 in the base plate 36a and over the depression 57 in the base plate 36a to seal the depression and opening as a primary chamber separate from the secondary chamber formed by the interior of the cup-like member 53.

Supported by that portion of the diaphragm 44a which extends over the dish-shaped depression 57 of the base plate 36a is a disk-shaped upper capsule plate 47a on which is centrally located a pedestal 48a having a concave depression 49a in its upper surface. A ball 50a rests in the depression 49a and carries a platform leg 51a also having a concave depression 52a in contact with the ball 50a.

When a load is placed upon the platform 34, pressure applied to that portion of the diaphragm 44a beneath the plate 47a is transmitted, by means of the passageway 56, to the underside of that portion of the diaphragm 44a which is above the cylindrical opening 54 in the base plate 36a. Since the diaphragm 44a is very flexible, this pressure is transmitted to the liquid above the diaphragm 44a in the cup-like member 53 and from there through the pipe 31a to the chamber 30 compressing the bellows contained therein. From the bellows, force is transmitted through the shelf lever 12 and multiplication lever 18 to the load counterbalancing pendulums 23, the indication of the amount of weight being shown by the indicator 28.

In the factory, or other location having ideal filling conditions, liquid in the correct amount and containing no air is piped through the hole 42a into the openings between the diaphragm 44a and the base plate 36a. When the proper amount of liquid has been placed in the capsule, and the air has been entirely exhausted therefrom, the plug 43a is screwed into the tapped hole 42a thus confining the proper amount of air free liquid in the chamber.

The embodiments of the invention that have been disclosed may be modified to meet various requirements.

Having described the invention, I claim:

1. In a weighing scale, in combination, a load receiver, a plurality of capsules supporting said load receiver, a primary diaphragm in each of said capsules, said primary diaphragm constituting a wall of an enclosure in said capsule, a secondary diaphragm constituting another wall of said enclosure, said primary and said secondary diaphragms being adapted to confine a quantity of liquid in said enclosure, a load supporting plate overlying said primary diaphragm and being supported solely thereby; an inlet for the introduction of such liquid into said enclosure and means for sealing said inlet and a secondary enclosure on the opposite side of said secondary diaphragm from the first mentioned enclosure and adapted to contain liquid to receive unmodified pressure through said secondary diaphragm without change in pressure per unit of area from liquid confined in the first mentioned enclosure.

2. In a weighing scale, in combination, a load receiver, a plurality of capsules supporting said load receiver, each of said capsules comprising a pressure plate a diaphragm underlying said pressure plate, an enclosure adapted to contain liquid confined therein by said diaphragm, an inlet for the introduction of liquid into said enclosure, means for sealing said inlet, a passageway adapted to be filled with a liquid and leading from said enclosure to the exterior of said capsule, and a flexible member mounted within said capsule and extending across said passageway, said flexible member being adapted to transmit pressure from the liquid confined within said passageway and said enclosure by said flexible diaphragm and said flexible member to the liquid in said passageway on that side of said flexible member farther removed from said enclosure.

3. In a weighing scale, in combination, a plurality of capsules adapted to contain liquid, each of said capsules comprising a base plate having a cavity in its upper surface, a flexible diaphragm overlying said cavity, there being a subordinate cavity in said base plate connected by a passageway with the first mentioned cavity, a secondary portion of said diaphragm also overlying said subordinate cavity, said first mentioned cavity, said passageway and said subordinate cavity all being formed into an enclosure within said capsule by said overlying diaphragm, an inlet for the introduction of liquid into said enclosure, means for sealing said inlet, and a secondary enclosure located on the opposite side of said secondary portion of said diaphragm from the first mentioned enclosure and adapted to contain liquid to receive pressure through said secondary portion of said diaphragm from liquid confined in the first mentioned enclosure, such liquid having pressure induced therein by loads placed on said weighing scale.

4. In a weighing scale, in combination, a plurality of capsules adapted to contain liquid, each of said capsules comprising a primary diaphragm, a secondary diaphragm, a plate interposed between said primary diaphragm and said secondary diaphragm, said plate having a passageway leading from beneath said primary diaphragm to above said secondary diaphragm, said primary diaphragm and said secondary diaphragm being adapted to confine liquid therebetween, an inlet for the introduction of liquid therebetween, means for sealing said inlet, a base plate located beneath said secondary diaphragm and having a depression in its upper surface located beneath said passageway, said depression being in communication with the exterior of said capsule and adapted to contain liquid to receive pressure through said secondary diaphragm from liquid confined between said primary diaphragm and said secondary diaphragm.

5. In a weighing scale, in combination, a plurality of capsules adapted to contain liquid, each of said capsules comprising a base, a passageway in said base leading to the upper surface of said base, a flexible diaphragm overlying the upper surface of said base and the open end of said passageway therein, a load supporting plate overlying said flexible diaphragm and being supported solely thereby, the other end of said passageway leading to the exterior of said base at a point not lying beneath said diaphragm, a flexible member clamped in said base and extending across said passageway, an inlet for introducing liquid into the space between said base and said diaphragm and into that portion of said passageway lying between such space and said flexible member, and means for sealing said inlet, said flexible member being adapted to transmit pressure from the liquid confined in said base by said flexible member and said diaphragm to a pressure transmitting liquid in that portion of said passageway lying outside said flexible member.

6. In a weighing scale, in combination, a plurality of capsules adapted to contain liquid, each of said capsules comprising a base, a flexible diaphragm overlying said base, means for clamping the edges of said diaphragm to said base, said diaphragm being adapted, with said base, to confine a quantity of liquid between said base and said diaphragm, a load receiving plate overlying said diaphragm and being supported solely thereby, a passageway in said base leading into the space between said diaphragm and said base, means for sealing said passageway, a second passageway in said base leading from between said base and said diaphragm to the exterior of said capsule and adapted to be filled with liquid, and a flexible member clamped to said base and extending across said passageway within said base to confine in said capsule the liquid introduced between said diaphragm and said base through the first mentioned passageway.

ROBERT S. BOHANNAN.